United States Patent
Sandstrom

(10) Patent No.: US 7,640,957 B2
(45) Date of Patent: *Jan. 5, 2010

(54) TIRE WITH RUBBER TREAD HIGHLY LOADED WITH A COMBINATION OF FILLER REINFORCEMENT AND OIL

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 612 days.

This patent is subject to a terminal disclaimer.

(21) Appl. No.: 11/234,549

(22) Filed: Sep. 23, 2005

(65) Prior Publication Data

US 2007/0072984 A1  Mar. 29, 2007

(51) Int. Cl.
*B60C 1/00* (2006.01)
*C08K 3/04* (2006.01)

(52) U.S. Cl. .................... 152/209.1; 523/220; 524/495; 524/496; 524/571

(58) Field of Classification Search .............. 152/209.1; 524/495, 496
See application file for complete search history.

(56) References Cited

U.S. PATENT DOCUMENTS

| | | | | |
|---|---|---|---|---|
| 3,954,131 | A | * | 5/1976 | Hoshino et al. ............ 152/517 |
| 4,171,676 | A | * | 10/1979 | Kennel ..................... 116/34 R |
| 4,644,988 | A | * | 2/1987 | Ahmad et al. ............ 152/209.1 |
| 4,803,020 | A | | 2/1989 | Valatis et al. .................. 264/22 |
| 5,430,087 | A | | 7/1995 | Carlson et al. ............... 524/496 |
| 5,736,611 | A | * | 4/1998 | Blok et al. .................. 525/305 |
| 5,780,537 | A | | 7/1998 | Smith et al. ................. 524/493 |
| 5,798,405 | A | | 8/1998 | Zimmer et al. ............. 524/496 |
| 6,211,279 | B1 | | 4/2001 | Mahmud et al. ............ 524/492 |
| 6,476,154 | B1 | * | 11/2002 | Maly et al. ............... 525/332.6 |
| 7,337,815 | B2 | * | 3/2008 | Spadone et al. .......... 152/209.1 |
| 2002/0161099 | A1 | | 10/2002 | Mahmud et al. ............ 524/492 |
| 2004/0198890 | A1 | * | 10/2004 | Kanenari .................... 524/495 |
| 2005/0096418 | A1 | | 5/2005 | Baranek ..................... 524/408 |
| 2005/0159535 | A1 | | 7/2005 | Spadone et al. ............ 524/496 |
| 2005/0209394 | A1 | | 9/2005 | Sandstrom et al. .......... 524/496 |

FOREIGN PATENT DOCUMENTS

| | | | |
|---|---|---|---|
| EP | 708137 | | 4/1996 |
| EP | 1457520 | | 9/2004 |
| JP | 06212024 | A * | 8/1994 |
| JP | 08188672 | A * | 7/1996 |
| JP | 2002020549 | A * | 1/2002 |
| WO | 188028 | | 11/2001 |
| WO | 2085953 | | 10/2002 |
| WO | 5017013 | | 2/2005 |

OTHER PUBLICATIONS

Machine translation of JP 06-212024, Aug. 2, 1994.*
Machine translation of JP 08-188672, Jul. 23, 1996.*
"Acetylene black. (Literature: materials)" The Free Library Sep. 22, 2002. Retrieved on Apr. 15, 2009 <http://www.thefreelibrary.com/Acetylene black. (Literature: materials)-a095794818>.*

* cited by examiner

*Primary Examiner*—Vickey Nerangis
(74) *Attorney, Agent, or Firm*—Henry C. Young, Jr.

(57) ABSTRACT

This invention relates to high performance tires designed for high vehicular speeds having thin treads with a maximum thickness of about three centimeters with a running surface which is comprised of a rubber composition which is highly loaded with a combination of reinforcing filler and rubber processing oil. The combination of reinforcing filler is comprised of conductive carbon black and optionally at least one of classical rubber reinforcing carbon black and precipitated silica and their mixtures. This high level of a combination of selective reinforcing filler together with rubber processing oil in the tread rubber is provided to promote a reduction in internal heat generation within the thin tread during high vehicular speeds, particularly for vehicles intended to be used as race cars. The carbon black reinforcement is provided as being comprised of a conductive carbon black, which may optionally be combined with a classical rubber reinforcing carbon black, and which may optionally be combined with an amorphous synthetic silica, namely a precipitated silica, to aid in providing a path for thermal conductivity through the thin, high reinforcing filler and rubber processing oil loaded tire tread to its running surface and thence to the ground in order to therefore promote a reduction in internal heat build up within the tread during high speed operation of the tire.

1 Claim, 1 Drawing Sheet

Figure 1:
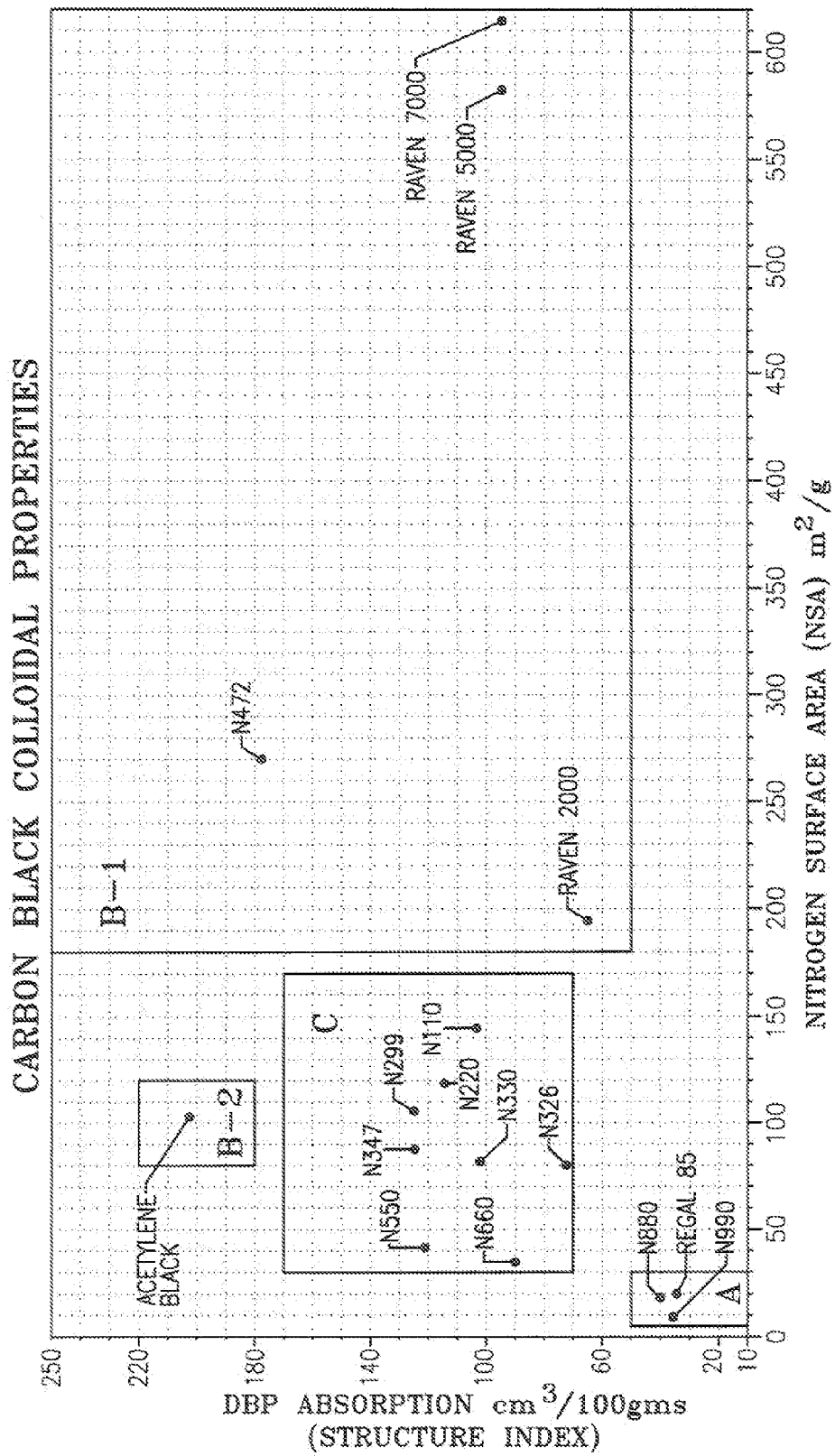

TIRE WITH RUBBER TREAD HIGHLY LOADED WITH A COMBINATION OF FILLER REINFORCEMENT AND OIL

FIELD OF THE INVENTION

This invention relates to high performance tires designed for high vehicular speeds having thin treads with a maximum thickness of about three centimeters with a running surface which is comprised of a rubber composition which is highly loaded with a combination of reinforcing filler and rubber processing oil. The combination of reinforcing filler is comprised of conductive carbon black and optionally at least one of classical rubber reinforcing carbon black and precipitated silica and their mixtures. This high level of a combination of selective reinforcing filler together with rubber processing oil in the tread rubber is provided to promote a reduction in internal heat generation within the thin tread during high vehicular speeds, particularly for vehicles intended to be used as race cars. The carbon black reinforcement is provided as being comprised of a conductive carbon black, which may optionally be combined with a classical rubber reinforcing carbon black, and which may optionally be combined with an amorphous synthetic silica, namely a precipitated silica, to aid in providing a path for thermal conductivity through the thin, high reinforcing filler and rubber processing oil loaded tire tread to its running surface and thence to the ground in order to therefore promote a reduction in internal heat build up within the tread during high speed operation of the tire.

BACKGROUND OF THE INVENTION

High performance tires having relatively thin treads designed for use at high vehicular speeds, such as for example race tires, typically have thin treads of rubber compositions which may contain high contents of a combination of reinforcing carbon black and rubber processing oil. The combination of a high loading of both carbon black and rubber processing oil in the tread rubber composition is provided in order to promote traction for the running surface of the tire tread for such tires intended for high speed operation.

However, the high loading of the combination of carbon black and processing oil in the tread rubber makes the thin tire tread more hysteretic with a greater propensity for internal heat generation, and resultant temperature increase of the tread rubber itself, at high vehicular speeds than a significantly lower loading of a combination of carbon black and rubber processing oil.

In particular, the heat buildup within the thin tread with the high loading of the combination of carbon black and rubber processing oil is more related to punishment of the thin tread against the road at high vehicular speeds than a heavy duty tire with a thick tread which is intended for heavy duty use under heavy vehicular loads pressing the thick tire tread onto the road surface at significantly slower vehicular speeds. Thus the problem of internal heat buildup for such high speed designed thin tire treads is of a different character than that of the indicated thick treaded heavy duty tires.

For this invention, the thin tire tread is of a rubber composition highly loaded with oil and a selected carbon black comprised of a conductive carbon black and optionally a classical rubber reinforcing carbon black and optionally containing a precipitated silica which is considered herein to promote high performance of the tire in a sense of traction of the tread running surface and to promote a heat conductive path from the tread to its running surface as the tire is being run under operating conditions, namely at a high vehicular speed.

In practice, the classical rubber reinforcing carbon black and/or precipitated silica reinforcing filler used in combination with a high content of rubber processing oil is provided to promote a higher hysteresis (e.g. lower rebound physical property) to promote traction for the thin rubber tread's running surface.

Historically, tires have been taught to be provided with various combinations of carbon blacks for various purposes. For example, see U.S. Pat. Nos. 5,798,405, 5,430,087, 5,780,537 and 6,053,226 and U.S. Patent Application No. 2005/0159535 A1.

In U.S. Patent Application No. 2005/0159535 A1, a heavy duty tire tread having a thick tread of at least 4 centimeters is provided with a combination of diverse carbon blacks to provide greater heat conductivity for the heavy duty tire tread and reduce its internal heat generation created under heavy loads for the tire. The tire tread of this invention differs significantly from such thick heavy duty tread in a sense that the thin tire tread of this invention designed to promote traction for the tread's running surface at high vehicular speeds and the significantly thicker tire tread of U.S. Patent Application No. 2005/0159535 A1 is designed to promote road hazard durability and resistance to tread wear for a tire intended to be run under slower speeds and carry significantly higher vehicular loads.

In the description of this invention, the terms "rubber" and "elastomer" where used, may be used interchangeably, unless otherwise prescribed. The terms "rubber composition", "compounded rubber" and "rubber compound", where used, may be used interchangeably to refer to "rubber which has been blended or mixed with various ingredients and materials" and such terms are well known to those having skill in the rubber mixing or rubber compounding art.

In the description of this invention, the DBP absorption values for carbon blacks is a dibutylphthalate value expressed in terms of cc/100 grams (or $cm^3$/100 grams) according to ASTM D2414. The Nitrogen Surface Area (referred to herein as "NSA") value is expressed in terms of square meters per gram ($m^2$/g) according to ASTM D3037.

SUMMARY AND PRACTICE OF THE INVENTION

In accordance with this invention, a pneumatic tire is provided having a thin tread having a maximum thickness of about three centimeters and a running surface, wherein said tread is of a rubber composition comprised of, based upon parts by weight per 100 parts by weight of rubber (phr):

(A) 100 parts by weight of at least one conjugated diene-based elastomer, (B) about 80 to about 400 phr of a combination of rubber processing oil and rubber reinforcing filler, wherein said rubber reinforcing filler is comprised of:

(1) about 50 to about 150, alternately about 70 to about 120, phr of particulate carbon black, and (2) from zero to about 50, alternately about 10 to about 40, phr of synthetic, amorphous silica, preferably precipitated silica, wherein said particulate carbon black is comprised of:

(a) about 10 to about 50, alternately from about 20 to about 45, phr of carbon black as at least one of:

(i) Category (A) carbon black characterized by having a DBP value in a range of from 10 to about 50 cc/100 g and a NSA value in a range of from about 10 to about 30 m²/g, and (ii) Category (B) carbon black selected from at least one of:

(ii-a) Category (B-1) carbon black having a DBP value in a range of from 50 to about 250 cc/100 g and a NSA value in a range of from about 180 to about 650 m²/g, and (ii-b) Category (B-2) carbon black having a DBP value in a range of from 180 to about 220 cc/100 g and a NSA value in a range of from about 80 to about 120 m²/g, and (b) zero to about 100, alternately from about 15 to about 85, phr of Category (C) carbon black having a DBP value in a range of from 70 to about 170 cc/100 g and a NSA value in a range of from about 30 to about 170 m²/g, and (C) about 30 to about 200 phr of rubber processing oil.

In practice, said rubber composition for said thin tire tread may desirably contain a coupling agent for said precipitated silica having a moiety reactive with hydroxyl groups (e.g. silanol groups) contained on said precipitated silica and another different moiety interactive with said conjugated diene-based elastomer(s). Use of such coupling agents to enhance its rubber reinforcing effect by aiding in coupling the precipitated silica to conjugated diene-based elastomers in a rubber composition is well known to those having a skill in such art.

Representative of said rubber processing oils are aromatic, naphthenic and paraffinic based rubber processing oils and combinations thereof. Such rubber processing oils are well known to those having skill in such art.

In practice, said thin tire tread is of a rubber composition which therefore contains said carbon blacks comprised of:

(A) at least one of said Category A, Category B-1 and Category B-2 carbon black, or mixture of at least two of said carbon blacks, or (B) combination of at least one Category C carbon black and at least one of said Category A, Category B-1 or Category B-2 carbon blacks or combinations thereof.

Therefore, for the thin tire tread, a Category A, Category B-1 and/or Category B-2 carbon black, which are generally not considered as being high rubber reinforcing carbon blacks but are considered herein as being relatively conductive carbon blacks, is used alone or in combination with a Category C carbon black which is conventionally considered as being a relatively high rubber reinforcing carbon black for the reinforcement of conjugated diene-based elastomers.

Representative of said Category A carbon blacks are, for example, N880 and N990 carbon blacks (ASTM designated carbon blacks) and Regal 85™ carbon black from the Cabot Corporation reportedly having DBP values of 40, 36 and 34 cc/100 gms, respectively and NSA values of 18, 9, and 20 m²/g, respectively.

Representative of said Category (B-1) carbon blacks are, for example, N472 carbon black (ASTM designation), and Raven 2000, Raven 5000 and Raven 7000 carbon blacks from the Columbian Carbon Company reportedly having DBP values of 178, 65, 95 and 95 cc/100 gms, respectively and NSA values of 270, 194, 583 and 613 m²/g.

Representative of said Category (B-2) carbon black is an acetylene derived carbon black such as "acetylene carbon black" from Chevron Chemical Company reportedly a DBP value of about 202 cc/100 gms and a NSA value of about 102 m²/g, Representative of said Category C carbon blacks are, for example, N110, N220, N299, N326, N330, N347, N550 and N660 carbon blacks (ASTM designations) reportedly having DBP values of 113, 114, 124, 72, 102, 124, 121 and 90 cc/100 gms, respectively and NSA values of 143, 119, 106, 80, 81, 88, 41 and 34 m²/g, respectively.

Carbon black properties such as DBP values and nitrogen surface area (NSA) values are well known to those having skill in such art.

For example, the DBP (dibutylphthalate) values for carbon black is normally considered to be a measure of its structure, or aggregate size and is expressed in cubic centimeters per 100 grams of carbon black. A higher DBP adsorption number indicative of larger aggregates which, in turn, is indicative of higher structure for the carbon black.

For example, the nitrogen surface area (NSA) values and iodine values for carbon black are normally considered to be a measure of its surface area and is expressed in units of square meters/gram (m²/g). A higher NSA value is indicative of smaller particle size which, in turn, is indicative of higher surface area for the carbon black and typically a higher reinforcing carbon black for elastomers.

DBP Numbers for various carbon blacks, together with associated ASTM designated N-numbers may be found, for example, in *The Vanderbilt Rubber Handbook*, Thirteenth Edition (1990), Page 417.

The Category A carbon blacks, with their significantly low DBP and low NSA values, are not normally considered as being high rubber reinforcing carbon blacks (relative to Category C carbon blacks).

The Category B-1 carbon blacks are of a very fine particle size, as indicated by their significantly high NSA value and are thereby not normally used for reinforcement of rubber compositions for tire components, relative to Category C carbon blacks, generally because they are somewhat more difficult to handle and to mix with the rubber composition.

The Category B-2 acetylene carbon blacks are not normally used to reinforce rubber compositions for tire components because they present a less reinforcing capability for tire component rubber compositions and have a significantly greater heat conductivity ability than Category C carbon blacks The Category C carbon blacks with their relatively intermediate defined ranges of DBP and NSA combinations of values are considered as representing rubber reinforcing carbon blacks which are typically used in diene based elastomer compositions for tire tread, carcass and sidewall applications.

BRIEF DESCRIPTION OF THE ACCOMPANYING DRAWING

The accompanying drawing is presented in a form of a graph to provide a further understanding of the invention in which the Category (A), Category (B) and Category (C) carbon blacks are presented in blocked out regions according to their DBP and NSA values in order to better appreciate their spaced apart characterizations.

The Accompanying Drawing (Graphical Presentation)

The accompanying graphical presentation presents the Categorized carbon blacks with a reference to their DBP values (y-axis) and NSA values (x-axis).

Box A of the drawing is presented to encompass the Category (A) carbon blacks having DBP values in a range from 10 to 50 cc/100 gm (or cm³/100 gm) and NSA values in a range of from 10 to 30 m²/g.

Box B-1 of the drawing is presented to encompass the Category (B) carbon blacks having DBP values in a range from 50 to 250 cc/100 gm and NSA values in a range of from 180 to 600 m²/g.

Box B-2 of the drawing is presented to encompass the Category (B) carbon blacks having DBP values in a range from 180 to 220 cc/100 gm and NSA values in a range of from 80 to 120 m²/g.

Box C of the drawing is presented to encompass the Category (C) carbon blacks having DBP values in a range from 70 to 170 cc/100 gm and NSA values in a range of from 30 to 170 m²/g.

For Box A, the aforesaid N880, N990 and Regal 85 carbon blacks are illustrated.

For Box B-1, the aforesaid N472, Raven 2000, Raven 5000 and Raven 7000 carbon blacks are illustrated.

For Box B-2, the aforesaid acetylene black type of carbon black is illustrated.

For Box C, the aforesaid N110, N220, N299, N326, N330, N347, N550 and N660 carbon blacks are illustrated.

It can readily be seen from the drawing that each of the carbon black types (A), (B) and (C) have distinct DBP and NSA values.

In the practice of this invention, as hereinbefore pointed out, the rubber composition is comprised of at least one diene-based elastomer, or rubber. Such elastomers are typically selected from homopolymers and copolymers of conjugated dienes and copolymers of conjugated diene(s) and vinyl aromatic compound such as, for example, styrene and alpha-methylstyrene. Such dienes may, for example, be selected from isoprene and 1,3-butadiene and such vinyl aromatic compounds may be selected from styrene and alpha-methylstyrene, preferably styrene.

Representative of such elastomers, or rubbers, are, for example, elastomers selected from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70 to 95 percent trans), low vinyl polybutadiene rubber (10 to 30 percent vinyl), high vinyl polybutadiene rubber (30 to 90 percent vinyl).

In one aspect, the rubber is preferably comprised of at least two diene-based rubbers. For example, a combination of two or more rubbers is preferred such as cis 1,4-polyisoprene rubber (natural or synthetic, although natural is usually preferred), 3,4-polyisoprene rubber, isoprene/butadiene copolymer rubber, styrene/isoprene/butadiene rubber, emulsion and solution polymerization derived styrene/butadiene rubbers, cis 1,4-polybutadiene rubbers, medium vinyl polybutadiene rubbers (30 to 55 percent vinyl), high vinyl polybutadiene rubbers (55 to 90 percent vinyl) and emulsion polymerization prepared butadiene/acrylonitrile copolymers.

In practice, the thermal conductivity of the tread rubber composition can be suitably determined by Holometrix TCA 300 procedure.

Numerous coupling agents taught for use in coupling silica and diene-based elastomers may be used in the practice of this invention for coupling the silica to the conjugated diene-based elastomer(s) for the thin tire tread rubber composition, particularly such couplers where the moiety for interacting with the elastomer is a polysulfide and the moiety for reacting with the silica (e.g. silanol groups) is a silane such as, for example, an alkoxysilane. For example, various alkoxysilane-based coupling agents might be used which contain a polysulfide bridge such as, for example, bis(3-trialkoxysilylalkyl) polysulfide having from about 2 to about 8, usually an average of about 2 to about 5, sulfur atoms in the polysulfidic bridge, particularly an average in a range of about 2 to about 2.5 or about 3.5 to about 4, where such alkyl groups may be selected from, for example, methyl, ethyl and propyl radicals, with the alkoxy groups preferably being selected from methoxy and ethoxy groups. A representative example could be bis(3-triethoxysilylpropyl) polysulfide.

The commonly employed siliceous pigments used in rubber compounding applications can be used as the silica in this invention, including pyrogenic and precipitated siliceous pigments (silica), although precipitated silicas are preferred.

The siliceous pigments which might be employed in this invention are preferably precipitated silicas such as, for example, those obtained by the acidification of a soluble silicate, e.g., sodium silicate.

The precipitated silica may have, for example, a BET surface area of the pigment, as measured using nitrogen gas, is in a range of about 80 to about 300, although more usually in a range of about 100 to about 200, although perhaps even up to about 360, square meters per gram. The BET method of measuring surface area is described in the *Journal of the American Chemical Society,* Volume 60, Page 304 (1930).

The precipitated silica may have, for example, a dibutylphthalate (DBP) absorption value in a range of about 150 to about 350, and usually about 200 to about 300 cc/100 gm.

Various commercially available silicas may be considered for use in this invention such as, for example only and without limitation, silicas commercially available from PPG Industries under the Hi-Sil trademark with designations 210, 243, etc; silicas available from Rhodia, such as, for example, Zeosil 1165MP and silicas available from Degussa AG with designations such as, for example, VN2, VN3, BV 3370GR and silicas from J. M Huber company such as, for example, Hubersil 8745.

It is readily understood by those having skill in the art that the rubber composition of the tread rubber would be compounded by methods generally known in the rubber compounding art, such as mixing the various sulfur-vulcanizable constituent diene polymers with various commonly used additive materials such as, for example, curing aids, such as sulfur, activators, retarders and accelerators, processing additives, such as oils, resins including tackifying resins, and plasticizers, pigments, fatty acid, zinc oxide, waxes, antioxidants and antiozonants, peptizing agents and reinforcing fillers such as, for example, silica and silica-carbon black mix. As known to those skilled in the art, depending on the intended use of the sulfur vulcanizable and sulfur vulcanized compounds or tread compounds, the additives mentioned above are selected and commonly used in conventional amounts.

Typical amounts of tackifier resins, if used, may comprise, for example, about 0.5 to about 10 phr, usually about 1 to about 5 phr. Typical amounts of processing aids may comprise, for example, about 1 to about 80 phr. Such processing aids can include, for example, aromatic, naphthenic, and/or paraffinic processing oils or plasticizer or low softening point polyethylene ether glycols. Typical amounts of antioxidants may comprise, for example, about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include stearic acid may comprise, for example, about 0.5 to about 4 phr. Typical amounts of zinc oxide may comprise, for example, about 2 to about 5 phr.

Typical amounts of waxes, if used, may comprise, for example, about 1 to about 5 phr. Often microcrystalline waxes are used. Typical amounts of peptizers, if used, may comprise, for example, about 0.1 to about 1 phr. Typical peptizers may be, for example, pentachlorothiophenol and dibenzamidodiphenyl disulfide. An antioxidant may be, for example, of the para-phenylene diamine and/or dihydrotrimethylquinoline type.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from, for example, about 0.5 to about 4 phr, with a range of from about one to about 2.5 sometimes being preferred.

Accelerators are used to control the time and/or temperature required for vulcanization and to improve the properties of the vulcanizate. Retarders are also used to control the vulcanization on-set.

In one embodiment, a single accelerator system may be used, i.e., primary accelerator. Conventionally and preferably, a primary accelerator(s) may be used in total amounts ranging, for example, from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate the cure and to improve the properties of the vulcanizate. Suitable types of accelerators that may be used in the present invention are, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The selection and amounts of the various compounding ingredients are not considered to be critical for the purposes of this invention, except where they may be especially emphasized elsewhere in this description, and can be adjusted or modified by the practitioner as deemed suitable for the desired tire tread properties.

The tire can be built, shaped, molded and cured by various methods which are readily apparent to those having skill in such art.

The rubber composition, or compound, for the tire tread may be prepared, for example, by mixing the ingredients in several sequential non-productive stages (without the sulfur and associated accelerator(s) curatives together with antidegradants) to temperatures of about 165° C. followed by a final productive mixing stage to a temperature of about 105° C. in which the curatives and antidegradants are added. An internal rubber mixer (e.g. Banbury type) is used. The resulting rubber compounds may then be extruded to form tread strips which, in turn, may be built onto a tire carcass and the resulting assembly vulcanized in a suitable mold at a temperature of about 150° C., to form a tire.

In the following Examples, the parts and percentages are by weight unless otherwise indicated.

EXAMPLE I

Experiments were undertaken to evaluate the feasibility of providing a conjugated diene-based rubber composition with a relatively high loading of rubber processing oil and reinforcing filler to promote heat dissipation (increase its heat, or thermal, conductivity).

A basic recipe for a rubber compositions are is provided in Table 1 which contains 53 phr of carbon black and 113 phr of processing oils and resin based tackifiers comprised of about 100 phr of rubber processing oil to provide an oil/carbon weight ratio of 53/100, or 0.53/1.

TABLE 1

| | Parts |
|---|---|
| Non Productive Mixing Step | |
| Natural cis, 1,4-polyisoprene rubber | 90 |
| Cis 1,4-polybutadiene rubber[1] | 10 |
| N550 Carbon black[2] | 53 |
| Processing oils, tackifier resins, fatty and rosin acids[3] | 113 |
| Precipitated silica[4] | 22 |
| Coupling agent[5] | 2 |
| Zinc oxide | 3 |
| Antidegradents[6] | 2 |
| Productive Mixing Step | |
| Sulfur | 2 |
| Sulfur vulcanization accelerator[7] | 3.3 |
| Sulfur vulcanization retarder[8] | 0.1 |

[1]Cis 1,4-polybutadiene rubber as BUD 1207 ™ from The Goodyear Tire and Rubber Company
[2]N550 a rubber reinforcing carbon black (an ASTM designation)
[3]Contains 100 phr of aromatic and naphthenic rubber processing oil
[4]Precipitated silica as HiSil 210 ™ from PPG Industries.
[5]Coupling agent as Si69 from Degussa as a composite (50/50 weight ratio) of carbon black and a bis(3-triethoxysilylpropyl) polysulfide having an average of from about 3.4 to about 3.8 connecting sulfur atoms in its polysulfidic bridge and reported in the Table in terms of the composite.
[6]Of the amine and quinoline types
[7]Tertiary butyl sulfenamide
[8]Retarder of the phthalimide type Rubber composition Samples A and B were prepared according to the basic recipe of Table 1.

Rubber Sample A was a Control rubber sample in which the carbon black was an ASTM N550 rubber reinforcing carbon black.

Rubber Sample B was similarly prepared in which the carbon black was a significantly more conductive acetylene carbon black than the N550 carbon black.

The rubber composition samples were prepared by mixing the elastomers(s) together with reinforcing fillers and other rubber compounding ingredients in a first non-productive mixing stage (NP) an internal rubber mixer for about 4 minutes to a temperature of about 140° C. The rubber mixture is then mixed in a productive mixing stage (PR) in an internal rubber mixer with sulfur curatives for about 2 minutes to a temperature of about 100° C. The rubber composition is sheeted out and cooled to below 40° C. between the non-productive mixing step and the productive mixing step.

The following Table 2 illustrates cure behavior and various physical properties of the rubber Samples Where cured rubber samples are evaluated, such as for the stress-strain, rebound, hardness, tear strength and abrasion measurements, the rubber samples were cured for about 32 minutes at a temperature of about 150° C.

TABLE 2

Comparative Rubber Compositions

|  | Control A | B |
|---|---|---|
| Rubber Samples |  |  |
| N 550 carbon black | 53 | 0 |
| Acetylene carbon black | 0 | 53 |
| Precipitated silica | 22 | 22 |
| Rubber processing oil | 100 | 100 |
| Carbon black, silica & processing oil | 175 | 175 |
| Rheometer, 150° C. (MDR)[1] |  |  |
| Maximum torque (dNm) | 4.4 | 4.8 |
| Minimum torque (dNm) | 0.8 | 0.8 |
| Delta torque (dNm) | 3.6 | 4.0 |
| T90, minutes | 10.7 | 11.8 |
| Stress-strain (ATS)[2] |  |  |
| Tensile strength (MPa) | 8.77 | 8.52 |
| Elongation at break (%) | 627 | 611 |
| 300% modulus, ring (MPa) | 2.13 | 2.29 |
| Rebound |  |  |
| 23° C. | 43 | 39 |
| 100° C. | 61 | 57 |
| Hardness (Shore A) |  |  |
| 23° C. | 30 | 33 |
| 100° C. | 30 | 27 |
| Tear strength[3] |  |  |
| 95° C., Newtons | 108 | 99 |
| RPA, 150° C., 10% strain, 1 Hz[4] |  |  |
| Storage modulus G', MPa | 202 | 218 |
| Tan delta | 0.20 | 0.21 |
| Thermal conductivity |  |  |
| W/mk, 100° C. | 0.21 | 0.26 |
| Increase in thermal conductivity | 23.8 percent |  |

[1]Data obtained according to Moving Die Rheometer instrument, model MDR-2000 by Alpha Technologies, used for determining cure characteristics of elastomeric materials, such as for example Torque, T90 etc.
[2]Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3]Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument.
[4]Data obtained according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June From Table 2 it can be seen that the heat conductivity of Rubber Sample B, which contained the acetylene carbon black increased by a factor of about 24 percent as compared to Control Rubber Sample A which contained the N550 carbon black.

This is considered herein to be significant in the sense of a thin tire tread composed of Rubber Sample B providing a path of heat conductivity to promote removal or heat from the tire through its running surface, and thence to the road over which its travels, during the running of the tire under operating conditions at high vehicular speeds, all with the relatively thin tread restriction.

Such phenomenon is further considered herein to be significant in a sense that the indicated heat conductivity benefit rendered to the thin tire tread was provided without a significant loss of significant rubber properties of the tread rubber composition itself.

EXAMPLE II

Experiments were undertaken to provide a diene hydrocarbon-based rubber composition in which 53 parts of an acetylene carbon black a Category B-1 carbon black was used to replace 43 parts of an N330 carbon black, a Category C carbon black, to increase the rubber composition's heat dissipation (increase its heat, or thermal, conductivity).

The basic recipe is illustrated in the following Table 4 which is identical to the basic recipe reported in Table 1 of Example I.

TABLE 4

|  | Parts |
|---|---|
| Non Productive Mixing Step |  |
| Natural cis, 1,4-polyisoprene rubber | 90 |
| Cis 1,4-polybutadiene rubber | 10 |
| Carbon black (N330) or 53 (acetylene black) | 43 |
| Processing oils, fatty acid and tackifier resins | 113 |
| Precipitated silica | 22 |
| Coupling agent | 2 |
| Zinc oxide | 3 |
| Antidegradents | 2 |
| Productive Mixing Step |  |
| Sulfur | 2 |
| Sulfur vulcanization accelerators | 3.3 |
| Sulfur vulcanization retarder | 0.1 |

Rubber composition Samples C and D are prepared according to the basic recipe of Table 4 in the manner of Samples A and B of Example I with the ingredients identified in the footnotes to Table 1 of Example I except for the above indicated carbon black selections.

Rubber Sample C was a Control rubber sample in which the carbon black was an ASTM N330 rubber reinforcing carbon black.

Rubber Sample D was similarly prepared in which the carbon black was a significantly more conductive acetylene carbon black than the N330 carbon black.

The following Table 5 illustrates cure behavior and various physical properties of the rubber Samples Where cured rubber samples are evaluated, such as for the stress-strain, rebound, hardness, tear strength and abrasion measurements, the rubber samples were cured for about 32 minutes at a temperature of about 150° C.

TABLE 5

Comparative Rubber Compositions

|  | Control C | D |
|---|---|---|
| Rubber Samples |  |  |
| N 330 carbon black | 43 | 0 |
| Acetylene carbon black | 0 | 53 |
| Precipitated silica | 22 | 22 |
| Rubber processing oil | 100 | 100 |
| Carbon black, silica & processing oil | 165 | 175 |
| Rheometer, 150° C. (MDR)[1] |  |  |
| Maximum torque (dNm) | 4.3 | 4.1 |
| Minimum torque (dNm) | 0.9 | 1 |

TABLE 5-continued

Comparative Rubber Compositions

|  | Control C | D |
|---|---|---|
| Delta torque (dNm) | 3.4 | 3.1 |
| T90, minutes | 10.6 | 12.9 |
| Stress-strain (ATS)[2] | | |
| Tensile strength (MPa) | 7.8 | 8.6 |
| Elongation at break (%) | 606 | 614 |
| 300% modulus, ring (MPa) | 1.9 | 2.3 |
| Rebound | | |
| 23° C. | 46 | 44 |
| 100° C. | 67 | 61 |
| Hardness (Shore A) | | |
| 23° C. | 31 | 33 |
| 100° C. | 30 | 30 |
| Tear strength[3] | | |
| 95° C., Newtons | 74 | 74 |
| RPA, 150° C., 10% strain, 1 Hz[4] | | |
| Storage modulus G', MPa | 197 | 200 |
| Tan delta | 0.165 | 0.192 |
| Thermal conductivity | | |
| W/mk, 100° C. | 0.191 | 0.249 |
| Increase in thermal conductivity | | 30.4 percent |

From Table 5 it can be seen that the heat conductivity of Rubber Sample D, which contained the acetylene carbon black increased by a factor of about 30 percent as compared to Control Rubber Sample C which contained the N330 carbon black.

This is considered herein to be significant in the sense of a tire with a thin tire tread composed of Rubber Sample D providing a path of heat conductivity to promote removal or heat from the tire through its running surface, and thence to the road over which its travels, during the running of the tire under operating conditions at high vehicular speeds, all with the relatively thin tread restriction.

Such phenomenon is further considered herein to be significant in a sense that the indicated heat conductivity benefit rendered to the thin tire tread was provided without a significant loss of significant rubber properties of the tread rubber composition itself.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a thin tread having a maximum thickness of about three centimeters and a running surface, wherein said tread is of a rubber composition comprised of, based upon parts by weight per 100 parts by weight of rubber (phr):
   (A) 100 parts by weight of at least one conjugated diene-based elastomer selected from at least one of polymers of isoprene and/or 1,3-butadiene and copolymers of styrene and isoprene and/or 1,3-butadiene,
   (B) rubber processing oil and rubber reinforcing filler within a range of from about 80 to about 400 phr, consisting of from about 30 to about 200 phr rubber processing oil and from about 50 to about 150 phr of rubber reinforcing filler consisting of particulate acetylene carbon black having a DBP value of about 202 cc/100 g and an NSA value of about 102 m²/g;
   wherein said rubber processing oil is selected from at least one of aromatic, naphthenic and paraffinic based rubber processing oils.

* * * * *